# United States Patent
Martin et al.

(10) Patent No.: US 8,312,378 B2
(45) Date of Patent: Nov. 13, 2012

(54) UNIVERSALLY ACCESSIBLE PRINTER CONFIGURATION PAGE

(75) Inventors: Craig Warren Martin, Henrietta, NY (US); Michael Brian Kinn, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 413 days.

(21) Appl. No.: 12/646,293

(22) Filed: Dec. 23, 2009

(65) Prior Publication Data

US 2011/0154206 A1 Jun. 23, 2011

(51) Int. Cl.
*G06F 15/177* (2006.01)

(52) U.S. Cl. ................... 715/735; 715/734; 715/736

(58) Field of Classification Search ........... 715/734–735
See application file for complete search history.

(56) References Cited

U.S. PATENT DOCUMENTS

| | | | | |
|---|---|---|---|---|
| 6,246,485 B1* | 6/2001 | Brown et al. | ................ | 358/1.13 |
| 6,831,754 B1* | 12/2004 | Delaney | ...................... | 358/1.15 |
| 7,086,001 B1* | 8/2006 | Hicks et al. | .................... | 715/209 |
| 7,103,845 B2* | 9/2006 | Ueno et al. | .................... | 715/744 |
| 7,676,563 B2* | 3/2010 | Kothari et al. | ............... | 709/223 |
| 2006/0174206 A1* | 8/2006 | Jung et al. | ..................... | 715/751 |
| 2010/0107113 A1* | 4/2010 | Innes et al. | .................... | 715/779 |

\* cited by examiner

*Primary Examiner* — Michael Roswell
*Assistant Examiner* — William Titcomb
(74) *Attorney, Agent, or Firm* — Fox Rothschild LLP

(57) ABSTRACT

A system configured to organize and display configuration information associated with at least one digital printing apparatus. The system includes a processor, a communications interface operably connected to the processor and configured to establish an operable connection to at least one remotely located printing device, and a computer readable medium operably connected to the processor, the computer readable medium containing a set of instructions. The instructions are configured to instruct the processor to request configuration information from the at least one printing device, receive the configuration information from the at least one printing device, format the configuration information such that the configuration information is displayable in a window within the user interface, and display the configuration information.

17 Claims, 4 Drawing Sheets

UNIVERSALLY ACCESSIBLE PRINTER CONFIGURATION PAGE

BACKGROUND

The present disclosure relates to information collection and presentation. More specifically, the present disclosure relates to printer configuration information collection and presentation.

Many office devices such as printers, copiers and multi-function devices (e.g., a single device capable of scanning, printing, faxing and/or copying) are capable of producing a configuration page. The configuration page lists various pieces of information related to the individual device such as printer controller information, scanner configuration, types of media being used in the device, usage statistics, and other related information. The configuration page may also contain licensing information such as, in the case of a leased device, how many hours has the device been used. When operational problems or issues arise, this information is often vital in diagnosing and solving the problem.

In general, the configuration page is only available in a printed form. Typically, a user may have to go to the device and instruct the device to print its current configuration page. Alternatively, the user may remotely request the device print the configuration page, and the user physically goes to the device to obtain the printed copy. Some devices allow a user to access configuration information remotely via a specialized user interface (UI) or set of web pages. This information is generally unsorted and may cover many pages. When searching for a specific piece of information, such as any recent changes in configuration of the device, the user may spend several hours searching the multiple pages of information to find the piece they are interested in. When trying to debug a device that is malfunctioning, the hours taken to find a specific piece of information related to the problem causing the malfunction may result in considerable lost productivity time for an office relying on the device.

Recently, many businesses are striving to be more "green" or environmentally friendly. Typical green businesses try to reduce wasted paper and wasted worker production by eliminating worker downtime. Typical solutions for obtaining device configuration pages do not conform to typical green standards as printing multiple configuration pages wastes a great deal of paper.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a system for organizing and displaying configuration information associated with at least one digital printing apparatus. The system includes a processor, a communications interface operably connected to the processor and configured to establish an operable connection to at least one remotely located printing device, and a computer readable medium operably connected to the processor, the computer readable medium containing a set of instructions. The instructions are configured to instruct the processor to request configuration information from the at least one printing device, receive the configuration information from the at least one printing device, format the configuration information such that the configuration information is displayable in a window within the user interface, and display the configuration information.

In another general respect, the embodiments disclose a method for organizing and displaying configuration information associated with at least one digital printing apparatus. The method includes requesting, at a computing device, configuration information from at least one remotely located printing device; receiving, at the computing device, the configuration information from the at least one printing device; formatting, by a user interface installed on the computing device, the configuration information such that the configuration information is displayable in a window within the user interface; and displaying, via the user interface, the configuration information.

In another general respect, the embodiments disclose a computing device configured to organize and display configuration information associated with at least one digital printing apparatus. The computing device includes a processor, a communications interface operably connected to the processor and configured to establish an operable connection between the computing device and at least one remotely located printing device, and a computer readable medium operably connected to the processor, the computer readable medium containing a set of instructions. The instructions are configured to instruct the processor to request configuration

BRIEF DESCRIPTION OF THE DRAWINGS

Aspects, features, benefits and advantages of the present invention will be apparent with regard to the following description and accompanying drawings, of which.

DETAILED DESCRIPTION

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing and scanning, in which case such a device may be considered a multifunctional device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

"Configuration information" refers to information relating to the operational conditions and/or parameters of a printing device. For example, configuration information may include controller configuration information, optional controller features, print engine configuration, installed media, communication parameters, and any other information related to the operation of a printing device.

Figure 1:
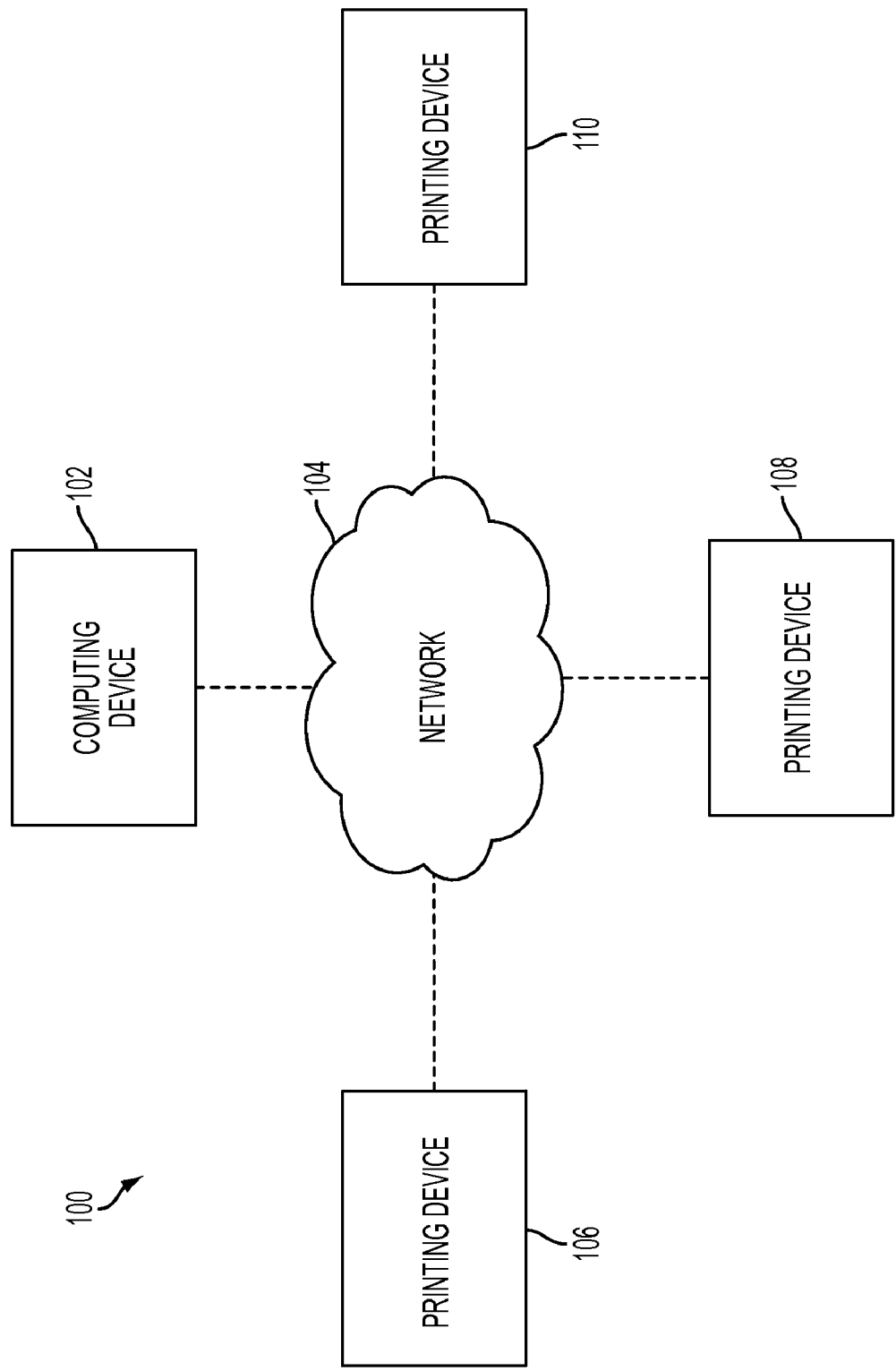
FIG. 1 illustrates an exemplary office environment including multiple printing devices according to an embodiment.

FIG. 1 illustrates a block diagram of an exemplary system 100 for collecting configuration information from one or more printing devices according to an embodiment. As shown in FIG. 1, the system 100 may include a computing device 102, printing devices 106, 108 and 110, and a network 104. The network 104 may include, but is not limited to, a local area network (LAN), a wide area network (WAN), the Internet, an intranet and/or any other communications network. It should be noted that a single computing device 102 is shown by way of example only. In a typical system, multiple computing devices would be shown; however, to simplify the example, a single computing device 102 will be discussed.

As discussed above, in a typical system, a user wishing to obtain configuration information for the printing devices 106, 108 and 110 would have to go to each printing device and obtain a printed configuration page. In the system 100, the printing devices 106, 108 and 110 are configured such that when a user at the computing device 102 requests a configuration page, each printing device sends any collected configuration information via network 104 to the computing device. The computing device may be configured to display the configuration information as an approximate version of what the printed configuration page looks like, or a WYSIWYG (what you see is what you get) data file version of the printed configuration page. A user at computing device 102 may access the configuration information via a UI or web browser. By providing the configuration information via network 104 to computing device 102, the user may be in a remote location from the printing device, such as an office in another city.

Figure 2:
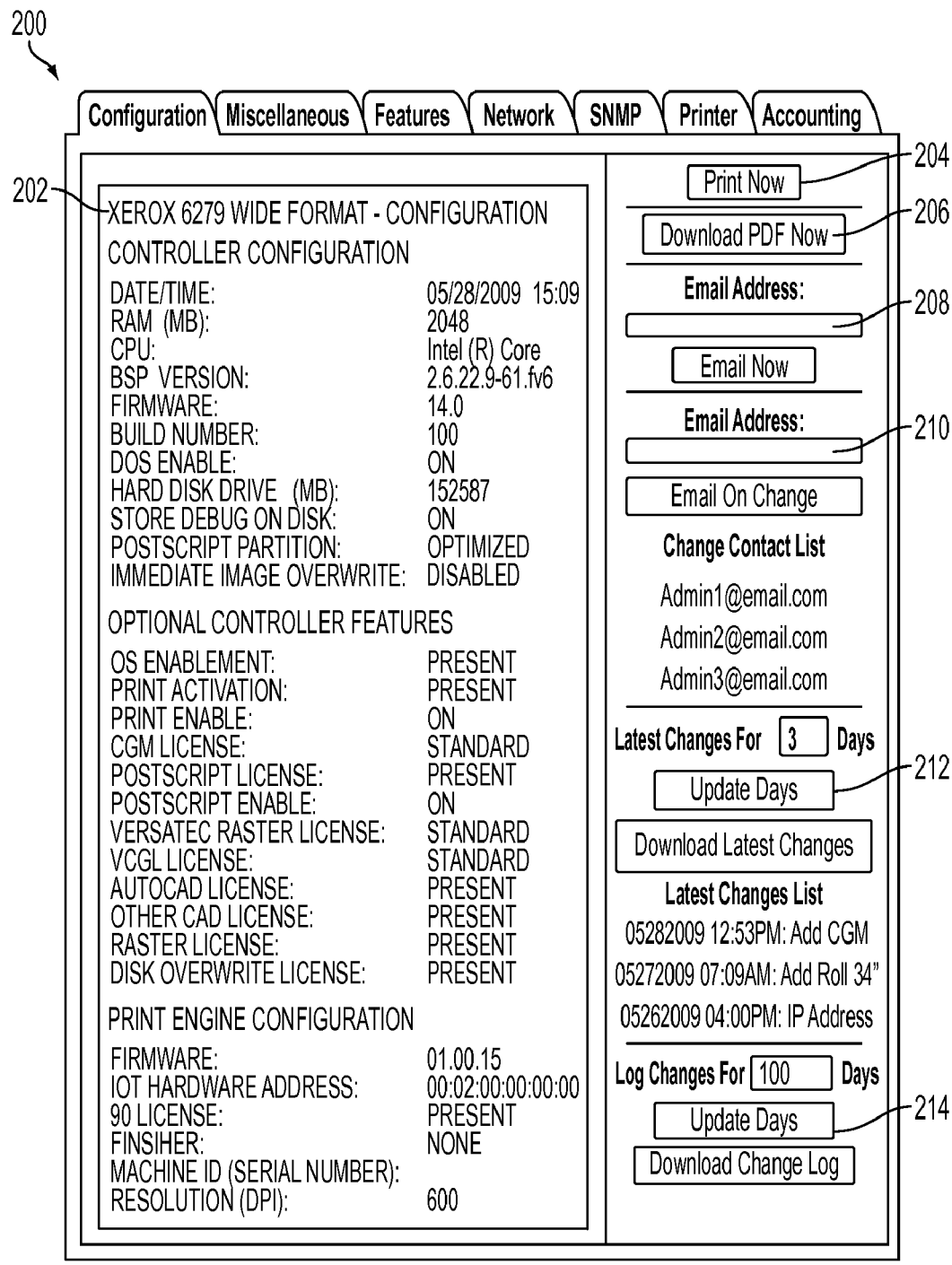
FIG. 2 illustrates an exemplary configuration page window according to an embodiment.

FIG. 2 illustrates an exemplary configuration page window 200 as it may be presented to a user at computing device 102 via a web browser or similar UI. The configuration page window 200 may include a view of organized configuration information 202. In contrast to the prior art where the configuration information was pages of unsorted data, the configuration information 202 may be organized such that it looks like a printed configuration page would, listing various pieces of information such as controller configuration, optional controller features, licensing information, and other printer device specific configuration information.

The window 200 may include various interactive features and options for further utilizing the configuration information. One feature may be to print 204 the configuration information. The print feature 204 may allow a user to print the configuration information at a more convenient location to their computing device, thereby conserving time and increasing the productivity of the user. A download feature 206 may also be included, providing the user a way of storing an electronic version, e.g., a PDF file, of the configuration information. The download feature 206 may provide the user with an easy way to store and catalog the configuration information.

The user may also have the option to email 208 the configuration information to another recipient. The configuration information may be saved as a digital file such as the PDF file discussed above before being emailed, or the information may just be included as text in the email. The window 200 may also provide the user with the option to email to multiple recipients.

The window 200 may also include a monitoring and/or downloading feature for any configuration information change. An email feature 210 may be provided for emailing a list of contacts, for example a list of network administrators, when any changes to the configuration information is made. The monitoring and/or downloading feature may further provide a user the option to filter the results such that the user is notified only when a certain type of change occurs, for example, when a license is added or removed. Similarly, a change monitoring feature 212 may be provided to monitor any changes to the configuration information over various time periods. For example, as shown in FIG. 2, any changes made in the last three days are listed. This information may also be downloaded. A log of changes may also be downloaded via a change log feature 214. The change log feature 214 may provide the user with an option of downloading a log of changes made over a variable time period, e.g., 100 days. A user may have the option to filter the log such that only specific types of changes are listed, for example, only controller configuration changes may be shown.

It should be noted that the additional interactive features and options shown in FIG. 2 are provided by way of example only. Features may be added or subtracted based upon the implementation of the configuration page window 200. For example, if there is only one authorized administrator, the contact list feature may be eliminated.

Figure 3:
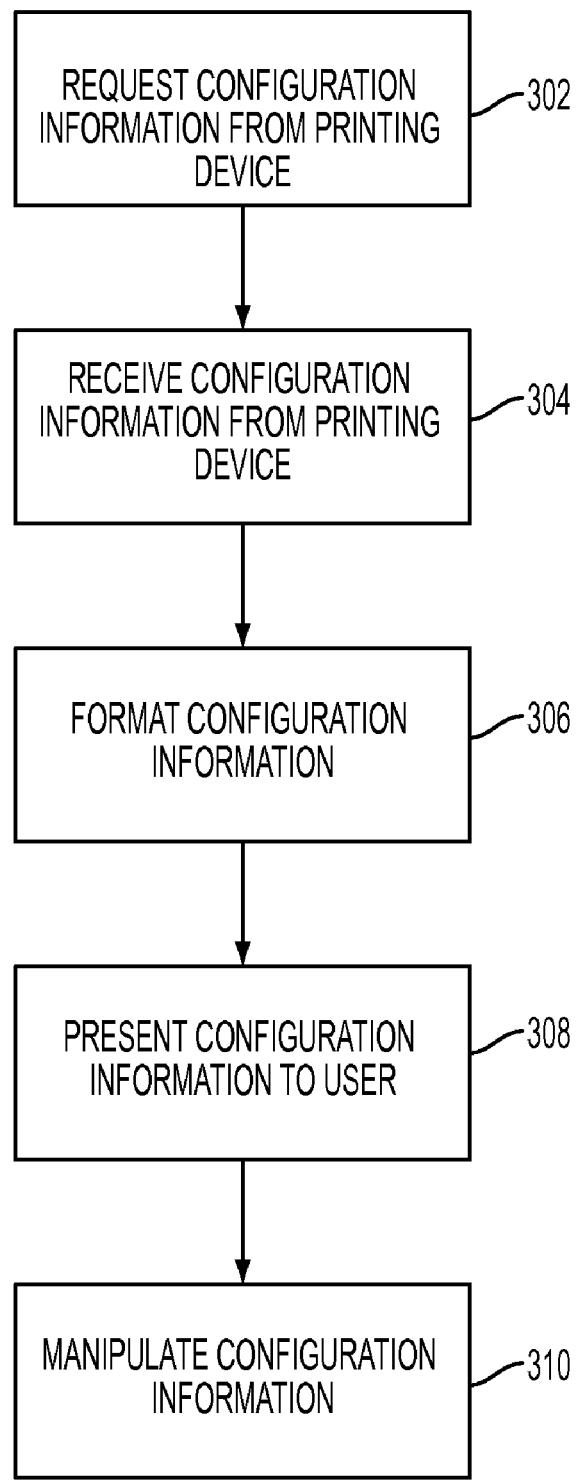
FIG. 3 illustrates a flow diagram of an exemplary method for remotely obtaining a device configuration page according to an embodiment.

FIG. 3 illustrates a flow diagram of an exemplary method for remotely obtaining a device configuration page. A user may select a printing device and request 302 any configuration information available from the printing device via a web browser or similar UI. The request may include various information related to the operational parameters of the requesting web browser or UI such that the printing device can format the configuration information for display by the web browser or UI. This eliminates one problem in the prior art where the configuration information is unformatted and displayed in a random listing having no identifiable structure or organization. Alternatively, the web browser of UI may receive 304 the configuration information from the printing device and then format 306 the configuration information into a format similar to that shown in configuration page window 200. The formatted 306 configuration information may be presented 308 to the user and the user, via the additional features discussed above such as download 206 and email 208, the user may manipulate 310 the configuration information as desired.

It should be noted that the configuration information may be formatted in a variety of ways. If the printing device has the processing capability, the printing device may make a WYSIWYG data file of what the printed version of the configuration information would resemble. Then, upon receipt of the data file, the web browser or UI may display the configuration information on the computing device.

Figure 4:
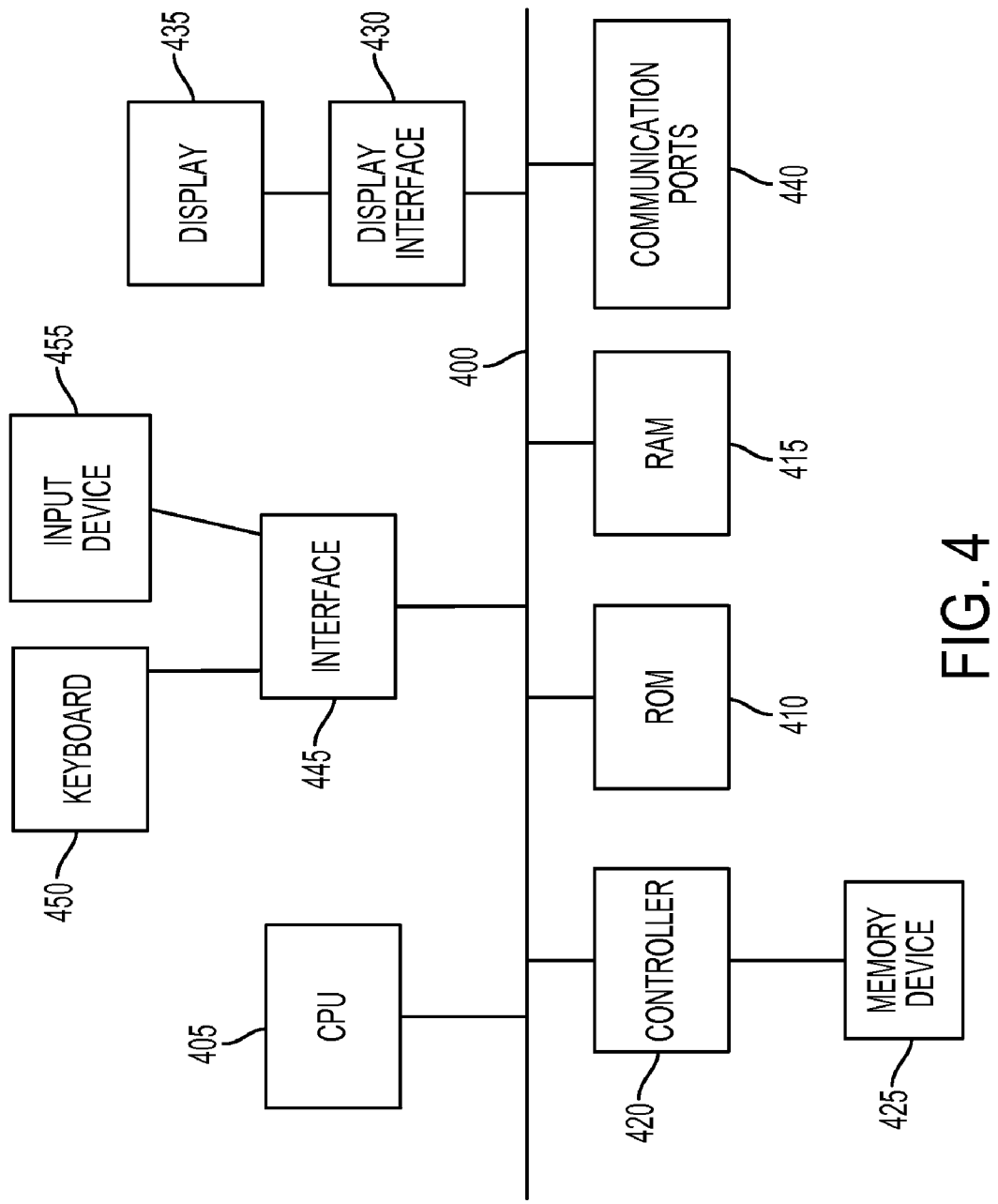
FIG. 4 illustrates various embodiments of a computing device for implementing the various methods and processes described herein.

The configuration information page described above may be presented on a display based on software modules including computer-readable instructions that are stored on a computer readable medium such as a hard drive, disk, memory card, USB drive, or other recording medium. FIG. 4 depicts a block diagram of exemplary internal hardware that may be used to contain or implement program instructions such as the steps for acquiring the printer configuration page discussed above in reference to FIGS. 2 and 3. A bus 400 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

The arrangement discussed above provides numerous benefits over the prior art. No additional software is required for the computing device; rather, any computing device capable of running a web browser or similar UI can obtain and display the configuration information. The multiple pages of unsorted configuration information as taught by the prior art is eliminated, thus reducing potential wasted time for the user reading the configuration information.

Additionally, time is saved as the user does not have to physically locate each printing device. In a large office building, finding each printing device can be a tedious and time consuming task. The present arrangement eliminates the need to locate the printing devices.

Similarly, wasted time may be reduced or eliminated as potential printing problems may be quickly identified based upon an overview of the changes made to a printing device's configuration. For example, if the controller software of a printing device is updated, a user or administrator for the printing device may be automatically notified that the change to the configuration information occur. The user may be able to identify whether the wrong controller software update was installed, and install the correct version before any malfunction is caused to the printing device due to incorrect software.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for organizing and displaying configuration information associated with at least one digital printing apparatus, the system comprising:
   a processor;
   a communications interface operably connected to the processor and configured to establish an operable connection to at least one remotely located printing device; and
   a computer readable medium operably connected to the processor, wherein the computer readable medium comprises one or more programming instructions that, when executed, cause the processor to:
      request configuration information from the at least one printing device,
      receive the configuration information from the at least one printing device, wherein the configuration information comprises one or more parameters of the at least one printing device relating to two or more of the following categories of configuration information:
         controller configuration information associated with a controller of the at least one printing device,
         one or more optional controller features of the at least one printing device,
         print engine configuration information associated with the at least one printing device,
         information pertaining to media installed on the at least one printing device,
         one or more communication parameters associated with the at least one printing device, and
         information pertaining to one or more licenses associated with the at least one printing device,
      format the configuration information such that the configuration information is displayable in a window within a user interface,
      display the configuration information in the window within the user interface such that the configuration information is organized and displayed in the window by category of information,
      display one or more interactive features in the window within the user interface, wherein the one or more interactive features comprise a change log feature,
      receive a selection of the change log feature; and
      in response to receiving the selection of the change log feature, generate a log of changes to the configuration information that occurred over a time period.

2. The system of claim 1, wherein:
   the one or more programming instructions that, when executed, cause the processor to display one or more interactive features comprise one or more programming instructions that, when executed, cause the processor to display a download interactive feature in the window within the user interface;
   the computer-readable storage medium further comprises one or more programming instructions that, when executed, cause the processor to:
      receive a selection of the download interactive feature, and
      in response to receiving the selection of a download interactive feature, download a data file comprising the configuration information.

3. The system of claim 1, wherein one or more programming instructions that, when executed, cause the processor to generate a log of changes to the configuration information comprise one or more programming instructions that, when executed, cause the processor to download the log of changes.

4. The system of claim 1, wherein:
   the one or more programming instructions that, when executed, cause the processor to display one or more interactive features comprise one or more programming instructions that, when executed, cause the processor to display an email feature in the window within the user interface;
   the computer-readable storage medium further comprises one or more programming instructions that, when executed, cause the processor to:
      receive a selection of the email feature, and
      in response to receiving the selection of the email feature, email the configuration information to one or more additional recipients.

5. The system of claim 1, wherein the computer readable medium further comprises one or more programming instructions that, when executed, cause the processor to notify the user if any changes are made to the configuration information.

6. A method for organizing and displaying configuration information associated with at least one digital printing apparatus, the method comprising:
   requesting, at a computing device, configuration information from at least one remotely located printing device;
   receiving, at the computing device, the configuration information from the at least one printing device, wherein the configuration information comprises one or more parameters of the at least one printing device relating to two or more of the following categories of configuration information:
      controller configuration information associated with a controller of the at least one printing device,
      one or more optional controller features of the at least one printing device,
      print engine configuration information associated with the at least one printing device,
      information pertaining to media installed on the at least one printing device
      one or more communication parameters associated with the at least one printing device, and
      information pertaining to one or more licenses associated with the at least one printing device;
   formatting, by a computing device, the configuration information such that the configuration information is displayable in a window within a user interface;
   displaying the configuration information in the window within the user interface such that the configuration information is organized and displayed in the window by category of information;
   displaying one or more interactive features in the window within the user interface, wherein the one or more interactive features comprise a change log feature;
   receiving a selection of the change log feature; and
   in response to receiving the selection of the change log interactive feature, generating a log of changes to the configuration information that occurred over a time period.

7. The method of claim 6, wherein:
   displaying one or more interactive features comprises displaying a download interactive feature in the window within the user interface; and
   the method further comprises:
      receiving a selection of the download interactive feature;
      in response to receiving the selection of a download interactive feature, downloading a data file containing the configuration information.

8. The method of claim 5, wherein generating a log of changes comprises downloading the log of changes.

9. The method of claim 6, further comprising emailing the configuration information to additional recipients.

10. The method of claim 6, further comprising notifying the user if any changes are made to the configuration information.

11. The method of claim 6, wherein the computing device comprises a portable computing device.

12. A computing device configured to organize and display configuration information associated with at least one digital printing apparatus, the computing device comprising:
   a processor;
   a communications interface operably connected to the processor and configured to establish an operable connection between the computing device and at least one remotely located printing device; and
   a computer readable medium operably connected to the processor, the computer readable medium comprising one or more programming instructions that, when executed, cause the processor to:
      request configuration information from the at least one printing device,
      receive the configuration information from the at least one printing device, wherein the configuration information comprises one or more parameters of the at least one printing device relating to two or more of the following categories of configuration information:
         controller configuration information associated with a controller of the at least one printing device,
         one or more optional controller features of the at least one printing device,
         print engine configuration information associated with the at least one printing device,
         information pertaining to media installed on the at least one printing device
         one or more communication parameters associated with the at least one printing device, and
         information pertaining to one or more licenses associated with the at least one printing device,
      format the configuration information such that the configuration information is displayable in a window within a user interface, and
      display the configuration information in the window within the user interface such that the configuration information is organized and displayed in the window by category of information,
      display one or more interactive features in the window within the user interface, wherein the one or more interactive features comprises a download interactive feature,
      receive a selection of the download interactive feature,
      in response to receiving a selection of the download interactive feature, generate an electronic version of the configuration information.

13. The computing device of claim 12, wherein:
   the one or more programming instructions that, when executed, cause the processor to display one or more interactive features comprise one or more programming instructions that, when executed, cause the processor to display a change log feature in the window within the user interface; and
   the computer-readable storage medium further comprises one or more programming instructions that, when executed, cause the processor to:
      receive a selection of the change log feature,
      in response to receiving a selection of the change log feature, filter any changes to the configuration information over a period of time, and
   display a log of changes to the configuration information.

14. The computing device of claim 12, wherein:
   the one or more programming instructions that, when executed, cause the processor to display one or more interactive features comprise one or more programming instructions that, when executed, cause the processor to display an email feature in the window within the user interface;
   the computer-readable storage medium further comprises one or more programming instructions that, when executed, cause the processor to:
      receive a selection of the email feature, and in response to receiving the selection of the email feature, email the configuration information to one or more additional recipients.

15. The computing device of claim 12, wherein the computer readable medium further comprises one or more programming instructions that, when executed, cause the processor to notify the user if any changes are made to the configuration information.

16. The system of claim 1, wherein the one or more programming instructions that, when executed, cause the processor to generate a log of changes to the configuration information comprise one or more programming instructions that, when executed, cause the processor to filter the log so that only certain types of changes are included.

17. The method of claim 6, wherein generating a log of changes to the configuration information comprises filtering the log so that only certain types of changes are included.

* * * * *